United States Patent [19]

Rouse

[11] Patent Number: 5,411,215
[45] Date of Patent: May 2, 1995

[54] TWO STAGE GRINDING

[76] Inventor: Michael W. Rouse, P.O. Box 820, Vicksburg, Miss. 39182-0369

[21] Appl. No.: 798,940

[22] Filed: Nov. 27, 1991

[51] Int. Cl.$^6$ .................... B02C 23/18; B02C 23/38
[52] U.S. Cl. ........................ 241/21; 241/29; 241/DIG. 31
[58] Field of Search ............... 241/20, 21, 29, 43, 241/DIG. 31

[56] References Cited

U.S. PATENT DOCUMENTS

| | | | |
|---|---|---|---|
| 2,126,672 | 8/1938 | Smith et al. | 241/DIG. 31 |
| 3,966,125 | 6/1976 | Finkbeiner | 241/14 |
| 4,535,941 | 8/1985 | Brubaker et al. | 241/21 |
| 4,625,922 | 12/1986 | Brubaker et al. | 241/17 |

FOREIGN PATENT DOCUMENTS 0870182 10/1981 U.S.S.R. .............. 241/DIG. 31

Primary Examiner—Mark Rosenbaum
Assistant Examiner—John M. Husar
Attorney, Agent, or Firm—Alexander Norcross

[57] ABSTRACT

An extremely efficient reduction of ten mesh feedstock to minus 80 mesh fine elastomeric rubber product may be obtained by interconnecting two sequential grinding mills. The first mill is fed a feedstock slurry reaching ten mesh particle elastomers in a transport fluid such as water. This mill is set to produce a minus 30 to 40 mesh in a single pass, preferably by use of a relatively coarse grinding stone producing a relatively high through put. Water or transport fluid is then added to the thirty mesh output of the first state to bring it back to a transportable slurry which is then fed to a second grinding stage set to produce an average minus 80 mesh particle. This can be produced best by a finer grit grindstone and concomitant advantages will occur due to the uniformity of the feedstock and the lack of large particles in achieving a higher through put.

2 Claims, 1 Drawing Sheet

SUPPORTING DATA

STAGE 1 GRINDERS

| GRINDER NO. | 11 | 13 | 15 |
|---|---|---|---|
| % PASSING 30M | | | |
| TEST 1 | 99% | 99% | 100% |
| TEST 2 | 98% | 100% | 100% |
| TEST 3 | 100% | 100% | 100% |
| TEST 4 | 100% | 100% | 100% |
| % PASSING 80M | | | |
| TEST 1 | 38% | 30% | 35% |
| TEST 2 | 40% | 40% | 37% |
| TEST 3 | 35% | 37% | 34% |
| TEST 4 | 36% | 38% | 39% |
| PRESSURE/PSI | 350 | 350 | 350 |

| GRINDER NO. | 2 | 4 | 6 | 7 | 8 | 9 | 10 | 12 | 14 |
|---|---|---|---|---|---|---|---|---|---|
| % PASSING 60M | | | | | | | | | |
| TEST 1 | 100% | 100% | 100% | 100% | 100% | 100% | 100% | 100% | 100% |
| TEST 2 | 100% | 100% | 100% | 100% | 100% | 100% | 100% | 100% | 100% |
| TEST 3 | 100% | 100% | 100% | 100% | 100% | 100% | 100% | 100% | 100% |
| TEST 4 | 100% | 100% | 100% | 100% | 100% | 100% | 100% | 100% | 100% |
| TEST 5 | 100% | 100% | 100% | 100% | 100% | 100% | 100% | 100% | 100% |
| % PASSING 80M | | | | | | | | | |
| TEST 1 | 93% | 94% | 91% | 97% | 96% | 95% | 92% | 93% | 95% |
| TEST 2 | 93% | 96% | 97% | 98% | 95% | 98% | 95% | 98% | 98% |
| TEST 3 | 95% | 95% | 95% | 96% | 98% | 97% | 96% | 96% | 97% |
| TEST 4 | 93% | 93% | 96% | 97% | 97% | 96% | 96% | 93% | 96% |
| TEST 5 | 98% | 98% | 95% | 98% | 96% | 95% | 96% | 97% | 95% |
| PRESSURE/PSI | 400/500 | 400/500 | 400/500 | 400/500 | 400/500 | 400/500 | 400/500 | 400/500 | 400/500 |

SUPPORTING DATA

STAGE 1 GRINDERS

| GRINDER NO. | 11 | 13 | 15 |
|---|---|---|---|
| % PASSING 30M | | | |
| TEST 1 | 99% | 99% | 100% |
| TEST 2 | 98% | 100% | 100% |
| TEST 3 | 100% | 100% | 100% |
| TEST 4 | 100% | 100% | 100% |
| % PASSING 80M | | | |
| TEST 1 | 38% | 30% | 35% |
| TEST 2 | 40% | 40% | 37% |
| TEST 3 | 35% | 37% | 34% |
| TEST 4 | 36% | 38% | 39% |
| PRESSURE/PSI | 350 | 350 | 350 |

| GRINDER NO. | 2 | 4 | 6 | 7 | 8 | 9 | 10 | 12 | 14 |
|---|---|---|---|---|---|---|---|---|---|
| % PASSING 60M | | | | | | | | | |
| TEST 1 | 100% | 100% | 100% | 100% | 100% | 100% | 100% | 100% | 100% |
| TEST 2 | 100% | 100% | 100% | 100% | 100% | 100% | 100% | 100% | 100% |
| TEST 3 | 100% | 100% | 100% | 100% | 100% | 100% | 100% | 100% | 100% |
| TEST 4 | 100% | 100% | 100% | 100% | 100% | 100% | 100% | 100% | 100% |
| TEST 5 | 100% | 100% | 100% | 100% | 100% | 100% | 100% | 100% | 100% |
| % PASSING 80M | | | | | | | | | |
| TEST 1 | 93% | 94% | 91% | 97% | 96% | 95% | 92% | 93% | 95% |
| TEST 2 | 93% | 96% | 97% | 98% | 95% | 98% | 95% | 98% | 98% |
| TEST 3 | 95% | 95% | 95% | 96% | 98% | 97% | 96% | 96% | 97% |
| TEST 4 | 93% | 93% | 96% | 97% | 97% | 96% | 96% | 93% | 96% |
| TEST 5 | 98% | 98% | 95% | 98% | 96% | 95% | 96% | 97% | 95% |
| PRESSURE/PSI | 400/500 | 400/500 | 400/500 | 400/500 | 400/500 | 400/500 | 400/500 | 400/500 | 400/500 |

Fig. 1

TWO STAGE GRINDING

BACKGROUND OF THE INVENTION

This patent pertains to the reduction of elastomeric particles to a very small size by abrading or grinding the particles between rotating milling wheels.

It has been found particularly advantageous in recycling and reusing elastomeric products to reduce the size of the rubber to very small size particles which are considered to be chemically more reactive and mechanically easier to dissolve into various mixes or recycled uses.

A wide range of rubber or synthetic rubber products may be so treated. Typical such materials include natural or synthetic rubber scrap, automotive tire scrap, and various polymers and plastics.

Various methods have been suggested in the prior art for reducing fine sized elastomeric particles as part of a reclaiming or recycling process including cryogenic cracking of the particles and various grinding or chopping methods.

However, the most productive method for producing particles in the very small range, defined as being particles that will pass a minus 50 mesh or finer, has been by grinding the rubber between horizontal grind stones in the manner well understood in the art and developed in the flour, paper pulp grinding industry and, most closely analogous to grinding rubber in the paint pigment compounding industry.

Previous methods for grinding rubber such are shown in for example U.S. Pat. No. 4,535,941 to Brubaker, et al which shows a method of horizontal grinding rubber pellets in which the pellets are introduced as a mixed rubber fluid slurry between and the milling wheels are pressed upon the pellets and slurry with considerable force in an effort to reduce them in a single pass to a fine state.

U.S. Pat. No. 4,625,922 to Brubaker shows another method for grinding rubber pellets utilizing elevated temperatures and pressures in an attempt to produce a fine rubber grind.

It has been found in practice that the above processes do not produce a uniformly fine grind and in fact, seldom produce particles in the claimed 50 micron range.

Further, adjustment of the grinding mills, which are the same mills widely used in the paint pigment compounding industry, is extremely critical under the methods previously disclosed. For instance, the first Brubaker patent requires pressure of over 2000 pounds be imposed between the milling wheels; the slightest cessation of seizure of slurry under these conditions would result in the instant contact of the milling wheels and the destruction of the same.

The attempt to simultaneously control motor current and stone pressure as variables results in wide swings and through put and an extreme variability in the quality of the produced product. It has proven in practice quite difficult to obtain sustained high uniform quality production rates using the processes heretofore described.

SUMMARY OF THE INVENTION

I have discovered that extremely efficient reduction of ten mesh feedstock to minus 80 mesh fine elastomeric rubber product may be obtained by interconnecting two sequential horizontal grinding mills. The first mill is fed a feedstock slurry reaching ten mesh particle elastomers in a transport fluid such as water. This mill is set to produce a minus 30 to 40 mesh in a single pass, preferably by use of a relatively coarse grinding stone producing a relatively high through put. Water or transport fluid is then added to the thirty mesh output of the first state to bring it back to a transportable slurry which is then fed to a second grinding stage set to produce an average minus 80 mesh particle. This can be produced best by a finer grit grindstone and concomitant advantages will occur due to the uniformity of the feedstock and the lack of large particles in achieving a higher through put.

It has been discovered that by providing a two pass two stage grinding operation by selecting optimum size the grinding stones for production of the intermediate feedstock and then for the production of the final minus 80 mesh to 200 mesh product, that the energy required, for example in the two stages for grinding the 80 mesh product is less than the energy consumed in attempting to direct grind an identical weight product from a ten mesh feedstock to a minus 80 mesh or smaller end point in one stage.

It is further discovered that, because the stones may be optimized for the intermediate feed stock and then optimized for the final feed stock, the intermediate feed stock being of a chosen small particle size, that the overall through put per hour is actually greater than if the two mills were operating in parallel attempting to direct reduce from ten mesh to minus 80 mesh. Three mills or more in series or staging would increase productivity even greater than two mills.

It is thus an object of the invention to disclose a method of grinding fine elastomeric particles which produces an increased quantity by weight of fine grind elastomeric particles from an initial feedstock with less expenditure of energy and electrical power for the grinding process.

It is a further object of the invention to disclose a production method for fine grind of elastomeric particles from an initial feedstock which has a higher weighted through put of desired fine grind output per unit of time for a given number of grinding machines.

These and other objects of the invention may be more clearly seen from the detailed description of the preferred embodiment which follows.

BRIEF DESCRIPTION OF THE DRAWINGS

FIG. 1 is a chart of grinder results showing particle sizes produced and percentage yield of the inventive process.

DETAILED DESCRIPTION OF THE PREFERRED EMBODIMENT

As is known, elastomeric particles may be reduced in size to relatively small sizes by horizontally grinding a slurry of coarser particles between opposed rotating grinding wheels. To date, the art has concentrated, as described above, on achieving a desired fine grind in a single pass, conceiving that this is intuitively the most efficient use of the machinery.

We have discovered that a more optimum use of multiple machines is in providing a two step grinding operation, optimizing a first grinding machine for a reduction from the original feedstock to an intermediate uniform fine feedstock, producing a slurry of the uniform fine feedstock and then optimizing a second bank of machines to reduce the fine feedstock in a single pass to the desired final stage.

In the prior art, it has been discovered that it is necessary to screen or otherwise filter and segregate the output of a single pass grinding operation, returning the coarse particles that do not pass the screening operation to the feed slurry for re-grinding. Thus the actual output particle throughput rate through a single pass machine, as measured by weight, is not an accurate indicator of the total production rate of the desired fine grind output. Such single pass grinding seems to produce considerably less than 100% yield of the desired fine grind in one pass. The finer the output desired, the less the percentage yield in one pass.

We therefore have interconnected two grinding mills to sequentially grind a rubber or polymer feedstock to a final fine grind state. A first grinding mill produces an intermediate feedstock of reduced size. The feedstock is re-wet with water or other transport liquid to form a feed slurry which is then sequentially fed into a second mill. In a single pass through the first and second mill it has been discovered that the output is consistently a high yield of the desired final fine mesh output.

In a first example, a first grinding mill was equipped with a 20 grit milling stone and fed with an input slurry averaging a 10 mesh feedstock consisting of 10% by weight of average ten mesh rubber particles in a water slurry. This mill was then set for an optimum flow rate. The resulting output was then re-liquified with water to form a uniform 10% by weight rubber content slurry, as required to replace water loss by flashover steam during the first stage grinding. This slurry was then split and fed into three mills using 24/36 grit stones.

It was determined by experiment that whereas only between 30 and 40% of the output from the first pass was of the desired minus 80 mesh rubber, that between 98 and 100% of the output of the first stage grinder was a minus 30 mesh rubber.

The feedstock comprising this, at least minus 30 mesh, rubber was then, as stated above, fed to three grinders with the finer grit stones. Examination of the output of each second stage grinder showed that, in after a single pass, 100% of the rubber passed a minus 60 mesh and in general between 95 and 100% of the rubber achieved a minus 80 mesh in a single pass. The test data is shown in FIG. 1.

It is considered that even greater through put could be obtained by using 12 or 16 grit milling stones in the stage 1 mills and by using a larger mill such as a 14-24 inch diameter grinding stone mill as a first stage mill to feed a plurality of smaller mills utilizing the 24 to 36 grit stones.

In fact, by splitting the grinding stages, each mill can be optimized for throughput. It can be seen that using a coarser stone produces a coarser output ground polymer, but that a given stone will produce an output having all output particles below a certain size. The examples given show that it is possible to achieve substantially all particles below the chosen minus 80 mesh size in only two stages, with proper choice of grinding stones and mill setup.

In analysis, the output results as shown in FIG. 1 clearly indicates that the total quantity of produced minus 80 mesh rubber has significantly increased in the two pass process whereas, based upon the data for the stage one grinders, a converging series would indicate that at least three pass reduction of the material would be required to approximate a 90% reduction to an 80 mesh stage. This analysis is based on the necessity of separating out and recirculating the 60 to 70 percent of the particles which are not reduced to an 80 mesh in passage through the first stage. This necessity of filtering, screening and recirculating the particles also significantly adds to the complexity of slurry handling. In the two step process, by contrast, all the slurry output from the first stage may be directly input to the second stage requiring only the addition of water to bring it to the desired liquified properties.

It can thus be seen that the method as disclosed of two stage grinding significantly increases the throughput of the same number of machines over the current process of repeated single pass grinding, subsequent filtration, and re-grinding of the unreduced portion of the output.

It has also been determined that, inasmuch as the first stage grinders are optimized for a coarser output, the second stage grinders have a reduced power loading due to receiving a more uniform fine feedstock. As a result, the total power and amperage consumption of the grinders is less, for a given through-put, than if the four grinders were used for attempted single pass reduction as disclosed in the prior art.

For illustrative purposes, a disclosed test using multiple passes and specifically chosen grinding wheels and combinations of grinders has been described. However, it is clear to see that the invention extends to that wider range of combination of grinder sizes, grits and intermediate feedstock as are inherent in the claims.

I claim:

1. A process for more efficient reduction of the size of polymer particles to less than a desired final size using grinding machines which may be set, by choice of grinding stone grit, to produce particles of a desired size, comprising:

providing a slurry of about ten percent weight ten mesh particulate rubber in a water carrier;

grinding said slurry in a first grinding mill having an approximately 12 to 16 grit grinding stone, such that substantially all of said rubber is ground to less than a minus 30 mesh particulate rubber in a single pass;

re-wetting said minus 30 mesh particulate rubber with water to form an intermediate slurry of about ten percent weight rubber in water;

grinding said intermediate slurry in a plurality of second grinding mills, each having an approximately 24/36 grit grinding stone, such that substantially all of said rubber is ground to less than a minus 80 mesh particulate rubber in a single pass.

2. The process of claim 1 further comprising:

providing said 12 to 16 grit grinding stone of a greater diameter than said 24/36 grit grinding stone.

* * * * *